United States Patent [19]

Hinger et al.

[11] Patent Number: 4,591,685
[45] Date of Patent: May 27, 1986

[54] NARROW GAP WELDING TORCH

[75] Inventors: Gary W. Hinger, Kent; Richard S. Crial, Federal Way, both of Wash.

[73] Assignee: The Boeing Company, Seattle, Wash.

[21] Appl. No.: 541,037

[22] Filed: Oct. 12, 1983

[51] Int. Cl.⁴ .............................................. B23K 9/16
[52] U.S. Cl. ..................................... 219/74; 219/136; 219/137.42
[58] Field of Search .............. 219/136, 137 R, 137.42, 219/137.62, 125.1, 74

[56] References Cited

U.S. PATENT DOCUMENTS

| | | | |
|---|---|---|---|
| 3,239,648 | 3/1966 | Syrigos | 219/137.43 |
| 3,679,866 | 7/1972 | Arikawa et al. | 219/137 R |
| 3,826,888 | 7/1974 | Garfield et al. | 219/74 |
| 3,924,095 | 12/1975 | Lucas, Jr. | 219/125.1 |
| 3,992,603 | 11/1976 | Reynolds | 219/136 |
| 4,005,305 | 1/1977 | Nelson et al. | 219/72 |
| 4,091,258 | 5/1978 | Kano et al. | 219/125.12 |
| 4,095,085 | 6/1978 | Tomita et al. | 219/123 |
| 4,289,950 | 9/1981 | Griebeler | 219/124.34 |
| 4,309,590 | 1/1982 | Stol | 219/136 X |
| 4,346,279 | 8/1982 | Lessmann et al. | 219/137.42 |
| 4,442,334 | 4/1984 | Lux et al. | 219/136 X |

OTHER PUBLICATIONS

"Twist Arc Welding Process for Narrow Gap Welding", Kobe Steel, Ltd., Welding Division, (3/1982).
"Current Status of Practical Application of Narrow Gap Welding in Japan", The Japan Pressure Vessel Research Council (9/1981).
"Narrow-Gap, Gas Metal Arc Welding Process in Flat Position", by S. Kimura, I. Ichihara & Y. Nagai, AWS Annual Meeting (Apr. 4–6, 1979).

Primary Examiner—Clarence L. Albritton
Assistant Examiner—C. M. Sigda
Attorney, Agent, or Firm—Schwartz, Jeffery, Schwaab, Mack, Blumenthal & Evans

[57] ABSTRACT

A narrow gap welding torch using a twisted wire center electrode. The torch has water-cooled gas bars and a water-cooled center. The gas bar delivers shielding gas to the weld site at a flow of about 100 cu.ft./hr. The water-cooled gas bars and center bars prevent splatter from adhering to the torch and permit the torch to operate at lower shielding gas flows. The water-cooled torch is also thin to enable gaps of narrower width to be welded which requires less weld material to be laid down and which permits welds to be accomplished more quickly and efficiently.

16 Claims, 5 Drawing Figures

NARROW GAP WELDING TORCH

FIELD OF THE INVENTION

The present invention relates to a welding device and more particularly to a torch for narrow gap welding.

BACKGROUND OF THE INVENTION

Narrow gap welding is a process wherein successive weld passes are applied directly on top of one another in a narrow groove or gap. Narrow gap welding techniques are particularly applicable to those situations where thick metal elements are to be joined by applying weld material in a narrow groove formed by opposing wall surfaces of the pieces to be joined. Inadequate sidewall fusion is a major problem in achieving satisfactory narrow gap welds. Because of this fusion problem, other techniques such as electroslag welding are commonly employed at the present time.

Narrow gap welding techniques are primarily useful for applications including but not limited to nuclear reactor pressure vessels, deep diving submarine hulls and heavy piping. All of these applications require high-quality welds that are impact resistant. Unfortunately, electroslag welds are impact deficient.

Several different types of narrow gap welding devices are presently known. Some utilize various oscillation or weld wire position variation devices which may employ weld head or weld wire drive systems that tend to require frequent service as a result of the harsh welding environment. U.S. Pat. No. 4,091,258 to Kano et al is typical of the type of torch which uses a linear mechanical oscillation to achieve the necessary sidewall fusion to affect an acceptable weld. U.S. Pat. No. 4,095,085 to Tomita et al discloses a torch which utilizes linear mechanical oscillation with electro-magnetic arc deflection for achieving adequate sidewall fusion. The arc is deflected by oscillating the welding wire or electrode.

Other narrow gap welding processes are described in U.S. Pat. No. 3,679,866 to Arikawa et al and in U.S. Pat. No. 3,328,556 which surveys several different narrow gap welding processes and apparatus.

Most of these prior art torches can potentially produce defective welds as a result of operator error or because the complex system fails to reverse the contact tip attitude as required. No electro-mechanical system for centering the welding electrode in the gap is presently known which eleminates overall system complexity and maintenance problems.

Other devices which utilize probe-type centering devices are subject to providing spurious error correction signals because of weld spatter which interferes with the probe contacts.

Twisted wire consumable electrodes provide rapid alternating arcing from sidewall to sidewall in a narrow gap which ensures adequate fusion and which, moreover, can accommodate variances of plus or minus ⅛ of an inch from the center of the groove without serious danger resulting from lack of fusion. Narrow gap gas arc welding devices employing twisted wire center electrodes are known, see for example, Table 1-1 of the publication entitled "Current Status of Practical Application of Narrow Gap Welding in Japan," September, 1981 by the Japanese Pressure Vessel Research Counsel and also FIG. 9 of "Twist Arc Welding Processes for Narrow Gap Welding," March, 1982 by Kobe Steel, Ltd., (hereinafter "Twist Arc Welding").

Up to the present time, none of the proposed arrangements for narrow gap welding have proven to be commercially successful. The reasons for lack of success have been manifold, but usually relate to the difficulty in obtaining high-quality welds at an economical rate. For instance, the torch disclosed in the Twist Arc Welding publication, while representing a simplification over the electrode oscillating devices discussed above, is nevertheless inefficient in that it requires considerable amounts of shield gas flow for stable welding operation - in fact, in excess of 125 ft/hr. of expensive inert gas. This appears to be due to the fact that the shielding gas is used not only to shield the weld but also to cool the gas bars of the torch. Such high gas flow rates are not only expensive to maintain but also results in accelerated gas errosion of the torch bars and associated upstream gas handling components.

SUMMARY OF THE INVENTION

It is therefore an object of the present invention to provide a narrow gap torch having a reduced flow of shielding gas in comparison with prior art narrow gap torches.

It is a further object of the invention to provide a narrow gap torch having water cooled gas bars.

It is a still further object of the present invention to provide a narrow gap torch which is operable to utilize consumable twisted wire center electrodes of different diameters.

It is a still further object of the present invention to provide a narrow gap torch having an easily replaceable contact tip.

It is moreover an object of the present invention to provide a narrow gap torch wherein the torch components which require frequent replacement are easily removable from and easily inserted in the torch.

It is moreover a still further object of the present invention to provide a narrow gap torch wherein the space between the shielding gas bars is readily adjustable in order to provide optimum shield gas flow configurations in accordance with the weld gap conditions.

To achieve the foregoing in other objects and in accordance with the purpose of the present invention, as embodied and broadly described herein, the apparatus of this invention may comprise a narrow gap welding torch for welding in a narrow gap formed by opposing walls of members to be welded. In accordance with the invention, the torch comprises a center bar having a bore therein through which a consumable center electrode is designed to pass. First and second gas bars are disposed on either side of the center bar and have means for delivering a supply of shielding gas to the area in the narrow gap being welded. Each of the gas bars has coolant passageways formed therein for circulating a liquid coolant, preferably water, through the gas bars in order to maintain the gas bars at an acceptably low temperature without the use of high shielding gas flow rates. In addition, the center bar is provided with a liquid coolant passageway for circulating liquid coolant through the center bar thereby maintaining the center bar at a low temperature to enhance the useful life of the center bar as well as to reduce the adherence of any weld spatter to the center bar.

Preferably, the means for delivering shielding gas comprises removable shielding gas diffuser plates positioned on shielding gas outlets of the gas bars.

Advantageously, the center bar is provided with a contact tip which is removably disposed at an end thereof, the contact tip having a bore therein which is axially aligned with the center bar bore. In this manner, contact tips having various bore diameters can be used to accommodate twisted wire center electrodes having different outside diameters. In this manner, the torch can be used with either a very thin or relatively thicker twisted wire electrode depending upon the specific welding task. Preferably, the contact tip is screw-threaded into the center bore for easy replacement.

Advantageously, the space between the gas bars may be adjustable in order that the torch may be used under different welding conditions. For instance, when the torch is used in a narrow gap which has a curve formed therein, it is advantageous to move the gas bars as close together as possible in order for the torch to negotiate the curve. However, when the gap is relatively wide and straight, the gas bars may be moved further apart in order that a larger area will be protected against air infiltration by the shielding gas.

In one preferred embodiment of the invention, the gas bars are formed from an electrically non-conducting material, and in another preferred embodiment of the invention, the gas bars are formed from an electrically conducting material but are electrically insulated from the center bar. It should be appreciated that because of the gas bars and center bar are water cooled, the torch elements may be made narrow enough to use in a narrow gap having a width of only about 0.35 to 0.45 inches. As will be appreciated by the artisan, by making the gap to be welded as narrow as possible, less welding material is needed to accomplish the weld which enhances the efficiency of the welding operation.

In accordance with a preferred embodiment of the invention, when the narrow gap to be welded is of shallow depth, a shielding gas box is provided which is adapted to be attached to the torch for providing a shielding gas space.

BRIEF DESCRIPTION OF THE DRAWINGS

The accompanying drawings which are incorporated in and form a part of the specification illustrate the preferred embodiment of the present invention and, together with the description, serve to explain the principles of the invention. In the drawings.

DETAILED DESCRIPTION OF THE INVENTION

Figure 1:
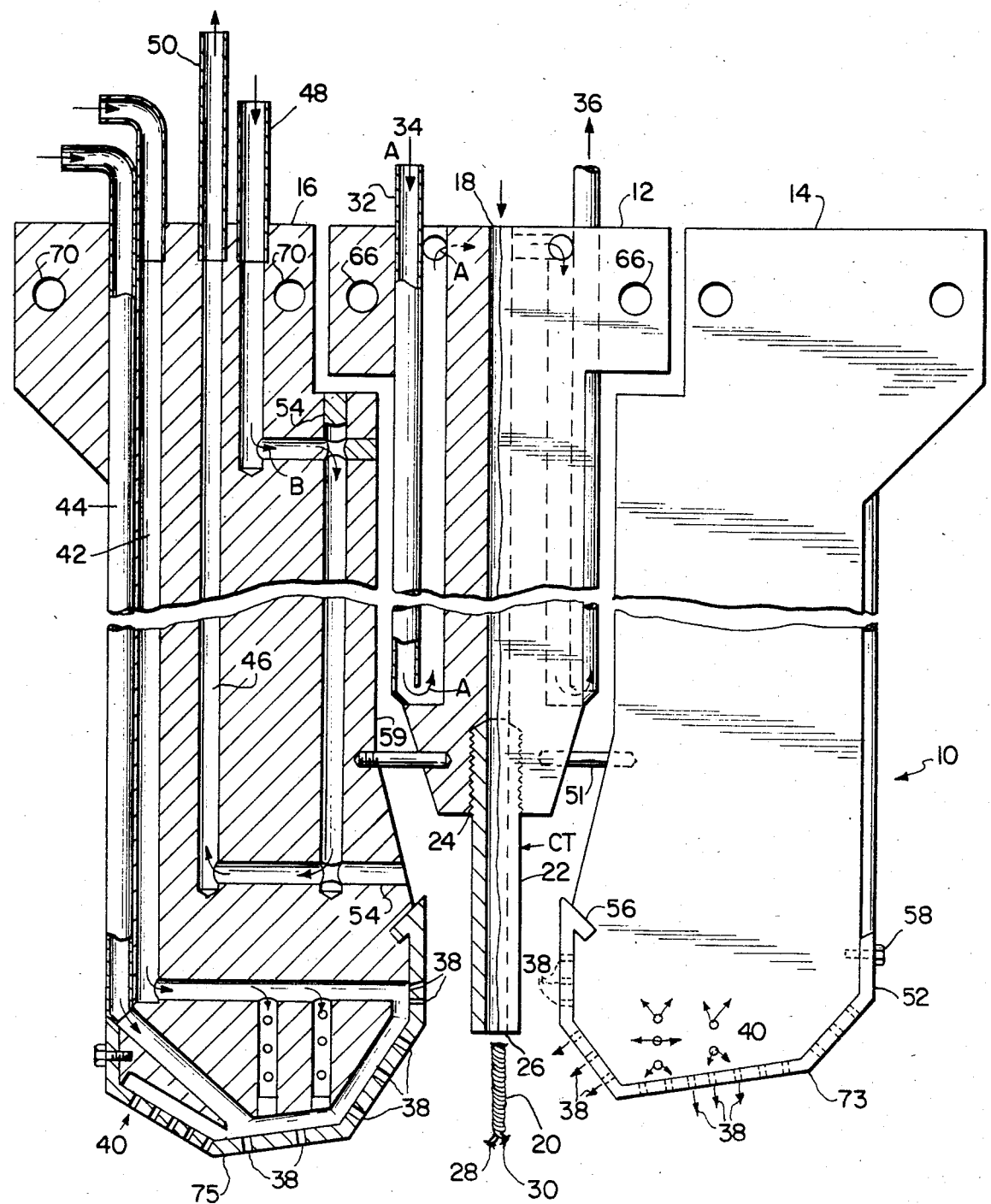
FIG. 1 is a fragmenting front view in partial section, of a narrow gap welding torch showing the water and gas flow conduits in one of the gas bars.

Reference will now be made in detail to the present preferred embodiment of the invention, an example of which is illustrated in the accompanying drawings. Turning first to FIG. 1, there is depicted a narrow gap welding torch 10 in accordance with the present invention. The torch comprises three basic members: a center bar 12 and gas bars 14 and 16.

The center bar 12 has a central passage 18 therein for passing a twisted wire electrode 20 therethrough. The twisted wire electrode 20 may also pass through an easily replaceable contact tip 22 which is preferably screwed into a threaded bore 24 formed at an end of the bore 18. The contact tip 22 has a bore 26 formed therein which axially aligns with the bore 18 to permit passage of the twisted wire electrode 20. As will be understood by the artisan, a series of contact tips 22 having bore 26 of different inner diameters can be provided for accommodating twisted wire electrodes 20 of varying outside diameters.

It should further be appreciated that the welding process which utilizes a twisted wire electrode does not employ any mechanical devices for the rotational movement of the tip of the wire electrode. Instead, this process utilizes the inherent rotational movement of the arc formed between the twisted wire electrode and the narrow gap. It is this rotational movement of the arc which is important in order to prevent the above-mentioned problem of lack of fusion on the sides of the gap or groove.

The consumable twisted wire electrode 20 comprises two intertwined wires 28 and 30. The arc formed during the welding process is alternatively generated from the forwardmost wire of the intertwined wires 28 and 30. In other words, as the twisted wire electrode is consumed, the arc generated from the forwardly-extending tip of the electrode is deflected in accordance with the twist of the wire. Thus, as the wire is consumed, the arc defines a rotating motion within the narrow gap.

In order to cool the center bar 12, a circulation passage 32 is provided. Low temperature coolant enters the passage 32 at inlet 34 and flows through the passage in the manner indicated by the circulation arrows A and exits at outlet 36. The coolant is preferably a fluid such as water since water can absorb significantly more heat than gas coolant and can thus maintain the center bar at a relatively reduced temperature thereby extending its useful life.

The replaceable contact tip 22 is preferably made of sintered tungsten or copper. By making the contact tip easily replaceable, the torch can be operated with twisted wire electrodes of various diameters as explained above. In those instances where the torch will be dedicated to use with a single diameter electrode, the variable diameter contact tip can be eliminated and the center bar merely extended to terminate at a position equivalent to the outlet of the contact tip. This is possible with the present invention since the liquid-cooled center bar is maintained at a relatively low temperature which has the effect of enhancing its service life and of reducing damage due to spattering of molten metal.

The center bar 12 of torch 10 may also be fabricated from sintered tungsten or copper. A coating of ceramic, such as zirconium oxide may be used to provide additional protection against the torch shorting out against the narrow gap being welded. However, in that regard, it has been found that with the water-cooled center bar of the present invention, there is a decreased likelihood of such shorting because weld spatter is less likely to adhere to the contact tip or to interrupt twisted wire electrode delivery or otherwise cause the torch to electrically short out. Where the center bar is not coated with a ceramic such as zirconium oxide, it is preferable to provide a layer of insulation 53 between the center bar 12 and the gas bars 14 and 16.

It should be appreciated that the precise profile of the center bar 12 illustrated in FIG. 1 is exemplary only as are the locations of the various bores which form the coolant passage 32 and minor variations thereof are well within the scope of the present invention. It is also anticipated that the center bar can be formed from a laminated structure where the coolant passages 32 are formed at the interface between the layers by etching or the like prior to their assembly.

The gas bars 14 and 16 cooperate to shield the welding arc and the pool of molten metal formed during the welding process. The gas bars are arranged to proceed and follow the twisted wire electrode 20 as the narrow gap is traversed. Each gas bar has primary shielding gas outlets 38 for directing shielding gas directly at the welding arc and molten metal and secondary shielding gas outlets 40 to direct shielding gas against the bottom of the groove and the groove sidewalls to thereby protect the arc against air infiltration. As best seen in connection with sectioned gas bar 16 of FIG. 1, the shielding gas is preferably provided by means of primary and secondary gas channels 42 and 44 respectively.

As alluded to above, the gas bars 14 and 16 are cooled by liquid coolant flowing through coolant passages 46. The coolant, preferably water, enters the passage 46 at inlet 48 and circulates through the coolant passage to the outlet 50. The direction of coolant circulation is indicated by circulation arrows B in FIG. 1. The circulation passages 46 may be formed by drilling appropriately located intersecting bores and providing appropriate plugs 54 to channel the coolant in a liquid-tight manner. Alternatively, the gas bars may be formed from a laminated construction consisting of two layers, the gas and coolant passageways being formed at the interface between the layers prior to joining the layers together to form a finished gas bar.

The shielding gas may be a mixture of argon, helium, and carbon dioxide or a mixture of argon and carbon dioxide. Other shielding gas mixtures can also be used within the scope of the present invention. Where both the primary and secondary shielding gases are the same, the passages 42 and 44 may be interconnected. One of the advantages of the present invention is that since the gas bars 14 and 16 are water cooled, the shielding gas flow is not required to maintain the gas bars at a reasonably low temperature. In fact, as alluded to above in connection with a torch which was not water cooled, shielding gas flow rates of over 125 cu.ft./hr. were utilized. Maintaining such gas flows is quite expensive and, moreover, results in accelerated erosion of all the torch components in the gas path. With the present invention, shielding gas flows of about 90 to 130 cu.ft./hr. are sufficient to affect stable welding operation and protect the torch components.

Figure 1A:
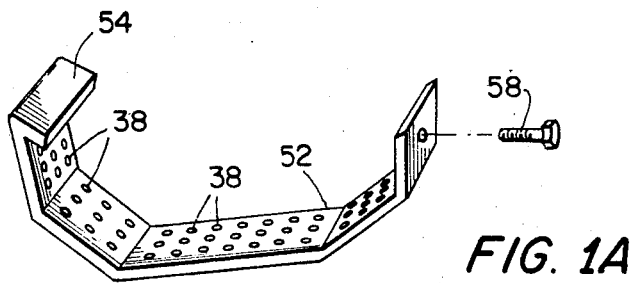
FIG. 1A is a perspective view of a removeable diffuser element for a gas bar of FIG. 1.

As illustrated in FIGS. 1 and 1A, each gas bar may be equipped with a removable diffuser plate 52. The diffuser plate 52 has a flanged end 54 which cooperates with a notch 56 in the gas bar to hold the diffuser plate in position. A fastening means 58 such as a screw or the ike can be used to attach the diffuser plate 52 to the gas bar. As will be apparent from FIGS. 1 and 1A, the geometry of the diffuser plate 52 is designed to fit snugly over the end of the gas bars 14 and 16.

It should be noted that although the relatively low gas flows used with the present invention extend the life of the gas handling equipment, those elements directy adjacent the welding arc may still be susceptable to some damage from spattering metal, heat or the like, and may require periodic replacement. The removable diffuser plates 52 of the present invention avoids the need to replace an entire gas bar should an end thereof become damaged.

In order to ensure that the vertical orientation between the gas bars 14 and 16 remains uniform during the welding operation, aligning pins 51, preferably formed from an electrically non-conducting material, may be utilized. The pins may be friction fitted in to the lining holes in the gas bars and center bar or may be screw-threaded on at least one end.

As noted in FIG. 1, the bottom edges 73 and 75 of the gas bars 14 and 16 respectively, are preferably aligned to form an angle of approximately 10 degrees with the horizontal thus enhancing the sweeping action of the leading gas bar 16 with respect to any air in the narrow gap to be welded. It is also contemplated that the gas bars 14 and 16 may be symmetrical with their bottom edges horizontally aligned. In another preferred embodiment, gas bars having horizontal lower edges can be used but with the vertical alignment between the two gas bars being adjustable.

An additional advantage of the liquid cooling aspect of the present invention is that the width of the gas bars and the center bar member may preferably be in the order of only 0.35 to 0.45 inches. This permits the torch 10 to be used in very narrow gaps which has the advantage of permitting the weld to be accomplished utilizing a smaller diameter center electrode and utilizing less weld material for joining the opposing members which form the gap. Since the rate at which weld material can be introduced into the gap is limited, this permits the weld to be accomplished more efficiently and quickly.

Figure 2:
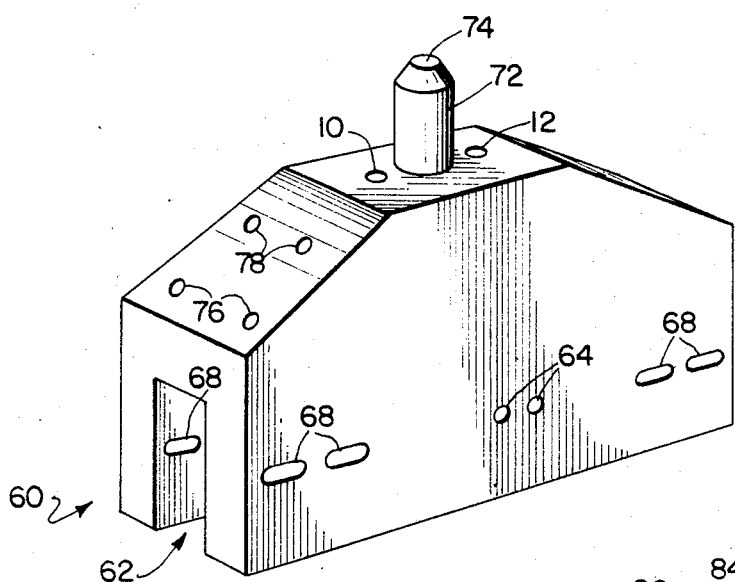
FIG. 2 is a perspective view of a mounting bracket for mounting the torch elements illustrated in FIG. 1.

Turning now to FIG. 2, there is illustrated an exemplary mounting bar 60 in accordance with the present invention. The mounting bar is preferably formed from an electrically non-conductive material so that the two gas bars and center bar are electrically isolated from each other. The gas bars 14 and 16 and center bar 12 are dimensioned to fit within the groove 62 and the mounting bar. Bores 64 are formed in the center of the mounting bar for passing fastening means which align with the bores 66 on the center bar 12. The gas bars 14 and 16 may be secured in the mounting bar 60 by quick release fastening means such as thumb screws or hex bolts (not illustrated) through the slots 68 which align with bores 70 in the gas bars. This mounting permits the spacing between the gas bars to be varied according to the welding conditions and also permits easy replacement of the gas bars as required. It should be appreciated that with variable spacing between the gas bars, the torch can be made to easily maneuver through curves in a narrow gap being welded by moving the gas bars close together. Where a relatively wide gap is being welded, the space between the gas bars can easily be increased to provide a larger shielding gas screen for the welding process. In order to permit the gas bars 14 and 16 to be spaced as close together as possible, their inner edges 57 and 59 respectively may be provided with electrical insulation to prevent the gas bars from establishing electrical contact with the center bar. This is especially important where the center bar is made from an uncoated conductor such as copper.

The mounting bar 60 may be further provided with a wire guide 72 having a bore 74 therein through which the consumable twisted wire electrode 20 passes as it is fed to the center bar 12. The bore 74 is designed to align with the bore 26 in the contact tip 22. Shielding gas supply lines 76 and water circulation lines 78 may be provided in the mounting bar in order to cooperate with the various gas inlets 42 and 44 and coolant flow inlets and outlets 48 and 50 respectively in the gas bars. Alternatively, these connections may be made in the gas bar at a position below the mounting bar to eliminate the need for passing supply lines through the mounting bar. Preferably, conventional quick disconnect mountings are used to connect the source of shielding gas and coolant to the torch to facilitate repair and replacement operations.

Figure 3:
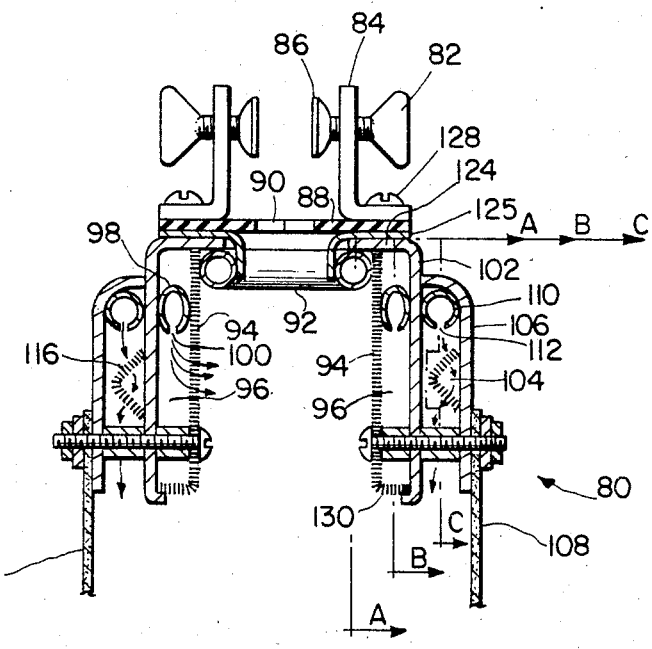
FIG. 3 is an end view of a gas shield box in accordance with the present invention indicating inner and outer shielding gas flow plenums.
Figure 4:
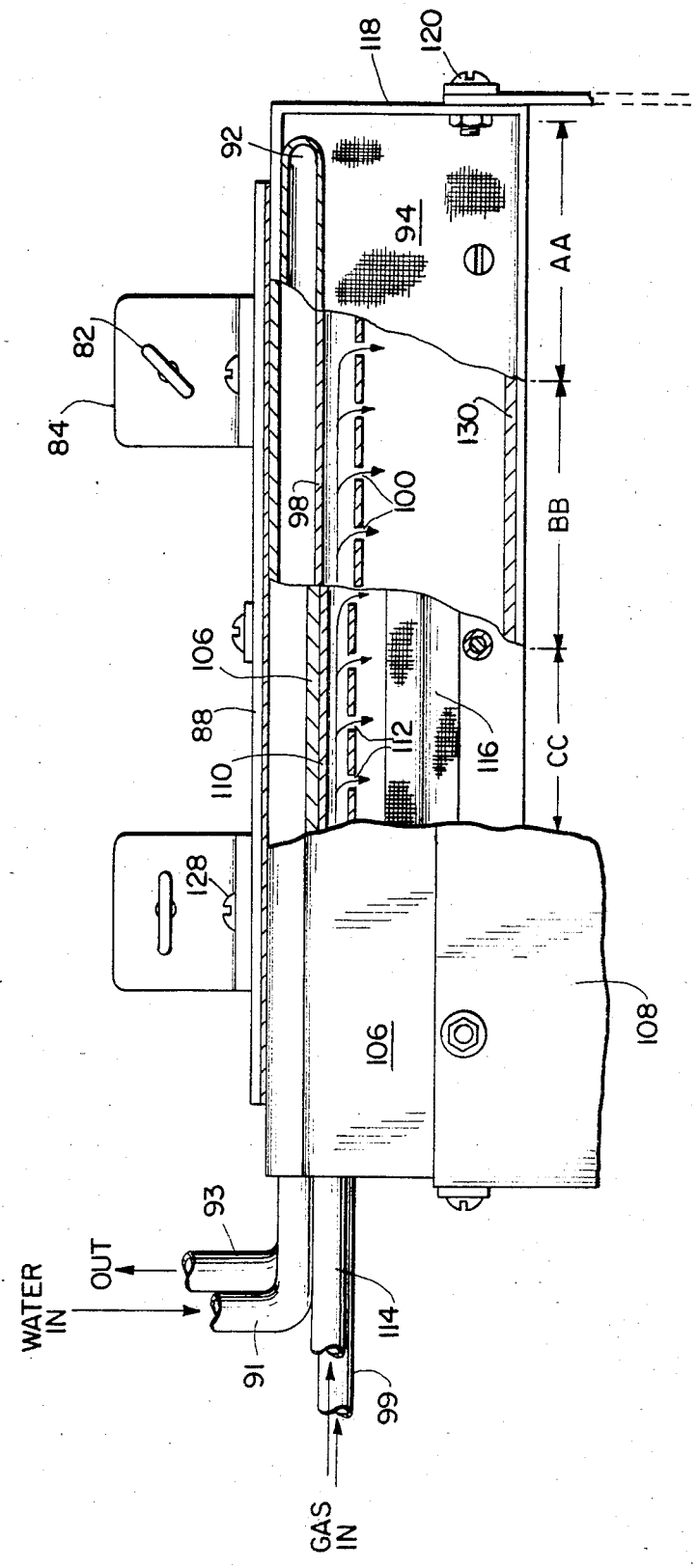
FIG. 4 is a side view of the gas shield box of FIG. 3, in partial section, illustrating the inner and outer shielding gas plenums and the liquid coolant passage.

Turning now to FIGS. 3 and 4, there are illustrated front and side views of a shield gas box 80 for use with the narrow gap welding torch of the present invention. As will be appreciated by the artisan, as the depth of the groove being welded becomes less than about 1 to 2 inches, additional shielding becomes necessary in order to permit the continuous welding up to the groove surface. Therefore, for welding in shallow groove depths, the shield box 80 is provided to feed shielding gas to the surface of the groove.

The shielding box 80 has means for removably fastening the box to the torch 10. Such means may include clamp screws 82 or the like which pass through upstanding brackets 84 and which clamp onto the mounting bars 14 and 16 by means of clamps 86.

A top plate 88 has a hole 90 accepting the twisted wire center electrode feed therethrough. Preferably, the top plate 88 is made of an insulator such as silicon rubber or the like.

A cooling water passageway 92 having inlet 91 and outlet 93 is provided for cooling the shield gas box. Preferably, the passage 92 is in thermal communication with a "Rigi-Mesh" diffuser wall 94 which forms a wall of inner shield portion 96 of the shield gas box 80. The diffuser wall 94 is operable to permit shield gas from a primary gas plenum 98 having openings 100 to pass from the inner shield portion 96 to the space adjacent the narrow gap being welded as indicated by the circulation arrows D. The plenum 98 is fed from gas inlet 99.

A wall 102 separates the inner shield portion 96 from an outer shield portion 104 which is defined by the wall 102, an outside wall 106, and a flexible, inflammable skirt 108. The outer shield portion 104 is supplied shielding gas by a gas plenum 110 having openings 112 and a gas inlet 114. A diffuser 116 is positioned in the outer shield portion 104 to diffuse the flow of shield gas which is used to sweep the area being welded and to prevent air infiltration. The skirt 108 is preferably made of fiberglass, extends completely about the box 80, and will generally form a loose seal against the weld area.

The box 80 has ends 118 which are fastened on by fasteners 120 to close the inner and outer portions 96 and 104 respectively.

Fasteners 122 may be used to screw the walls 106, 102, and diffuser 94 together.

Preferably, the wall 102 has an upper flange portion 124, that together with an L-shaped teflon insulator 125 or the like, is secured to the bracket 84 by means of fasteners 128. The diffuser wall 94 will preferably have a lower flange portion 130 which is also made of "Rigi-Mesh" or the like to permit shielding gas to flow at and around the weld site.

It should be appreciated that the shield gas box disclosed is exemplary only and may be modified as long as inner and outer shield gas flows are provided for shallow groove welding and the box can easily be attached to or be removed from the torch 10.

The foregoing description of a preferred embodiment of the present invention has been presented for purposes of illustration and description. It is not intended to be exhaustive or to limit the invention to the precise form disclosed, and obviously, many modifications and variations are possible in light of the above teachings. The embodiment was chosen and described in order to best explain the principles of the invention in its practical application to thereby enable others skilled in the art to best utilize the invention in various embodiments and with various modifications as are suited to the particular use contemplated. It is intended that the scope of the invention be defined by the claims appended hereto.

What is claimed is:

1. A narrow gap welding torch for welding in a narrow gap formed by opposing walls of members to be welded, comprising:
    a center bar having a bore therein for passing a consumable center electrode therethrough into a welding arc;
    a first gas bar disposed adjacent said center bar on one side thereof and having first means for delivering shielding gas to an area in said narrow gap being welded;
    a second gas bar disposed adjacent said center bar on another side thereof and having second means for delivering shielding gas to the area in said narrow gap being welded; and
    wherein first and second gas bars each have coolant passageways formed therein for circulating liquid coolant therethrough and said center bar has a liquid coolant passageway formed therein for circulating liquid coolant therethrough;
    said first and second shielding gas delivery means each including at least a first outlet for delivery of a first shielding gas directly at said welding arc and at least a second outlet for delivery of a second shielding gas to said opposing walls.

2. The narrow gap welding torch of claim 1 wherein said first and second means for delivering shielding gas further comprise first and second shielding gas outlets respectively and first and second removable shielding gas diffuser plates disposed over said first and second shielding gas outlets.

3. The narrow gap welding torch of claim 1 wherein said center bar further comprises a contact tip removably disposed at an end of said center bar, said contact tip having a bore therein axially aligned with said center bar bore for providing a continuous passageway for said consumable center electrode.

4. The narrow gap welding torch of claim 3 wherein said contact tip is screw-threaded into said bore in said center bar.

5. The narrow gap welding torch of claim 1 wherein a shielding gas space is defined between said first and second gas bars, and further including means for adjusting said shielding gas space.

6. The narrow gap welding torch of claim 1 wherein said gas bars are formed from an electrically non-conducting material.

7. The narrow gap welding torch of claim 1 wherein said gas bars are electrically insulated from said center bar.

8. The narrow gap welding torch of claim 5 further comprising a mounting bar for securing said first and second gas bars and said center bar together, said mounting bar having first and second mounting means for said first and second gas bars respectively and a third mounting means for said center bar.

9. The narrow gap welding torch of claim 8 wherein said means for adjusting said shielding gas space comprises said first and second mounting means and a fastening means.

10. The narrow gap welding torch of claim 8 further comprising a shielding gas box adapted to be removably attached to said narrow gap welding torch for welding a narrow gap of relatively shallow depth.

11. The narrow gap welding torch of claim 10 wherein said shielding gas box comprises an inner primary shielding gas plenum for delivering shielding gas to said shielding gas space and an outer secondary shielding gas plenum for preventing infiltration of air to said shielding gas space.

12. The narrow gap welding torch of claim 11 further comprising a non-flammable flexible skirt attached to said secondary shielding gas plenum to prevent infiltration of air to a space enclosed by said shielding gas box.

13. The narrow gap welding torch of claim 1 wherein said torch is operable to weld a gap having opposing surfaces separated by on the order of about 0.35 to 0.45 inches.

14. The narrow gap welding torch of claim 1 wherein said consumable center electrode comprises a twisted wire.

15. The narrow gap welding torch of claim 1 wherein a shielding gas flow rate of on the order of about 90–130 cu.ft/hr. is supplied to said gas bars for maintaining stable torch operation.

16. The narrow gap welding torch of claim 1 further comprising aligning pins for vertically aligning said first and second gas bars relative to said center bar.

* * * * *